Patented Aug. 28, 1945

2,383,497

UNITED STATES PATENT OFFICE 2,383,497

MINERAL OIL COMPOSITION

Ferdinand P. Otto and Ronald E. Meyer, Woodbury, N. J., assignors to Socony-Vacuum Oil Company, Incorporated, a corporation of New York No Drawing. Application July 8, 1943,
Serial No. 493,868

18 Claims. (Cl. 252—48)

This invention relates to the stabilization of petroleum products against the deleterious effects of oxidation and deterioriation with use, and more specifically relates to the improvement or stabilization of mineral oil fractions, particularly viscous mineral oils, by the use of novel reaction products, or a novel class of reaction products, which when admixed with a mineral oil fraction in minor proportions will prevent or delay undesirable changes taking place in the oil.

It is well known to those familiar with the art that substantially all of the various fractions obtained from mineral oils and refined for their numerous uses are susceptible to oxidation. This susceptibility of an oil fraction to oxidation and the manner in which oxidation manifests itself within the oil varies with the type and degree of refinement to which the oil has been subjected and with the conditions under which the oil is used or tested. In other words, the deleterious products formed in an oil fraction as a result of oxidation and the degree to which they are formed depends upon the extent to which the various unstable constituents, which may act as oxidation catalysts, have been removed by refining operations and also upon the conditions of use.

This invention relates to phosphorus and sulfur containing reaction products which are capable of stabilizing mineral oil fractions, particularly viscous mineral oil fractions.

More specifically, the present invention is predicated upon the discovery of a new and novel class of oil improving agents which are designated herein as stable, non-corrosive, phosphous- and sulfur-containing reaction products obtained by reacting substantially 1 mol of phosphorus pentasulfide ($P_2S_5$) with 4 mols of a sulfurized ketone at a temperature above about 100° C., the sulfurized ketone having been obtained by sulfurizing an unsaturated ketone with elementary sulfur at a temperature above about 150° C.

While all unsaturated ketones may be used herein, particularly preferred is dioleyl ketone which is also known in the art as di-heptadecenyl ketone. Contemplated for use also is the technical grade of dioleyl ketone, commonly known as "oleone."

We have found that the character of the reaction products of this invention is influenced to a large degree by the reaction temperature in the $P_2S_5$ reaction. For example, when the reaction of $P_2S_5$ and dioleyl ketone, or of $P_2S_5$ and the aforesaid sulfurized dioleyl ketone, is carried out at a temperature in the neighborhood of 140° C., the reaction product has a relatively high neutralization number (N. N.), which is a measure of its acidity; whereas, when the reaction temperature is maintained at about 200° C., the neutralization number of the reaction product is much lower. In other words, a relatively high temperature of the order of 200° C. or more may be resorted to in order to obtain slightly acidic, or even neutral, reaction products. The phosphorus and sulfur content of the reaction products of $P_2S_5$ and dioleyl ketone, and similarly of the reaction products of $P_2S_5$ and the aforesaid sulfurized ketone, obtained by varying the reaction temperature is not so effected inasmuch as such reaction products contain phosphorus and sulfur chemically combined at substantially the same molar ratio as in $P_2S_5$.

Although the exact chemical structure of the reaction products of this invention is not known at this time, our investigations have indicated that elementary sulfur most probably reacts at the olefin bonds of an unsaturated ketone and correspondingly at the olefin bonds of the unsaturated ketone-$P_2S_5$ reaction products; and have also indicated that $P_2S_5$ most probably reacts at the carbonyl group of unsaturated ketones and at the same group of a sulfurized unsaturated ketone. This is indicated by the substantial absence of an evolution of hydrogen sulfide during the reaction with elementary sulfur and during the reaction with $P_2S_5$. It is also borne out by the fact that almost as much $P_2S_5$ combines chemically with the sulfurized ketone (unsaturated) as with unsulfurized unsaturated ketones.

The oil improving reaction products of this invention are believed to be novel in that previous disclosures have shown that compounds containing sulfur, not phosphorus and sulfur, are formed in the reaction of $P_2S_5$ with certain ketones. More specifically, Spring, in the Bull. Soc. Chim. (France) 2, 40, 67, has disclosed that a dimer thioketone, $C_6H_{12}S_2$, is obtained when acetone is warmed with $P_2S_5$; and Gatterman in the Ber. 28, 2877, has disclosed that thiobenzophenone is obtained when benzophenone in benzene solution is heated with $P_2S_5$ for several hours at 130° C. in a bomb.

The sulfurized ketones which are reacted with $P_2S_5$ to form reaction products contemplated herein are obtained by heating an unsaturated ketone with elementary sulfur at an elevated temperature, particularly at a temperature above about 150° C. Preferred of such sulfurized ketones are those obtained by treating an unsaturated ketone with from about 5 to about 15 parts of elementary sulfur at a temperature from about 175° C. to about 200° C. The sulfurized ketones so obtained are stable and non-corrosive, and are then reacted with $P_2S_5$. While the reaction with $P_2S_5$ and certain sulfurized ketones may be carried out at temperatures above about 100° C., it is preferred that the reaction temperatures used fall within the temperature range of 140° C. to 200° C. In this reaction the molar ratio of sulfurized ketones to $P_2S_5$ is 4:1. This reaction is carried out for a sufficient time in order that the reaction product so obtained will be non-corrosive to a polished copper strip immersed in a 1 per cent blend of the reaction product in mineral oil for 3 hours at 150° C.

Similarly, an unsaturated ketone may be reacted with $P_2S_5$ in a molar ratio of 4:1 at the aforesaid reaction temperatures above about 100° C. and the phosphorus- and sulfur-containing reaction products so obtained may then be reacted with elementary sulfur at an elevated temperature. In this regard, the amount of elementary sulfur used and the reaction temperature employed will be as indicated above.

Several modifications of the procedure described above may be resorted to for the obtainment of particularly desirable products. We have found that the use of a non-oxidizing or inert gas, such that the reaction mixture is under a non-oxidizing atmosphere, provides us with reaction products characterized by a high degree of stability. Inert gases, such as nitrogen, carbon dioxide, etc., may be used for this purpose in both the $P_2S_5$ reaction and in the sulfurizing reaction. As another modification unreactive or substantially inert diluents such as acid treated kerosene may be used during these reactions, or may be admixed with the reaction products so obtained to aid in refining the same, and may be removed thereafter by a suitable means such as by distillation. For example, a mineral oil may be used as an inert diluent in order to obtain a mineral oil blend or concentrate of the desired reaction product.

The reaction products contemplated herein and the preparation thereof are illustrated by the following typical examples in which a particularly preferred ketone, oleone, is used:

EXAMPLE ONE

REACTION PRODUCT OF SULFURIZED OLEONE AND $P_2S_5$ IN MINERAL OIL (a) *Preparation of sulfurized oleone*

Seventy-five grams of oleone, 8.5 grams of elementary sulfur and 150 grams of mineral oil diluent (Saybolt Universal viscosity of 67 seconds at 210° F.) are charged to a reaction vessel equipped with a mechanically-driven stirrer, an upright Liebig condenser, a thermometer and an inlet tube extending to within a few inches above the mixture. The atmosphere above the mixture is constantly swept with nitrogen gas (introduced through the aforesaid inlet tube) in order to maintain a non-oxidizing atmosphere above the mixture. The mixture is stirred and heated at 170° C. for 3 hours and the reaction product so obtained is sulfurized oleone.

(b) *Preparation of sulfurized oleone-$P_2S_5$ reaction product*

The reaction product obtained in (a) is allowed to cool to 140° C. and 9.0 grams of $P_2S_5$ are then added. The reaction mixture is stirred and heated at 140° C. for 2 hours and is then filtered through "Hi-Flo" on a steam heated Buchner funnel in order to remove any deleterious by-products and any unreacted $P_2S_5$. The reaction product is a brown viscous oil containing 5.1 per cent sulfur and 0.67 per cent phosphorus and having a neutralization number (N. N.) of 14.5. This product is referred to hereinafter as Product one.

A 3 per cent blend of this sulfurized oleone-$P_2S_5$ reaction product obtained in mineral oil, that is, a 1 per cent blend of this concentrate in mineral oil, caused only a slight tarnish or discoloration of a polished copper strip immersed in said blend for 3 hours at 150° C.

EXAMPLE TWO

REACTION PRODUCT OF OLEONE-$P_2S_5$ AND SULFUR IN MINERAL OIL (a) *Preparation of oleone-$P_2S_5$ reaction product*

Sixty-five grams of mineral oil diluent (Saybolt Universal viscosity of 67 seconds at 210° F.), 60 grams of oleone and 6.6 grams of $P_2S_5$ were charged to a vessel equipped as described in Example one (a), and were stirred and heated at 200° C. for 2½ hours. The reaction mixture was then filtered through "Hi-Flo" on a steam heated Buchner funnel in order to remove any deleterious by-products and any unreacted $P_2S_5$.

(b) *Preparation of oleone-$P_2S_5$ and sulfur reaction product*

One hundred and thirty grams of the oleone-$P_2S_5$ reaction product obtained in (a), that is, a 1:1 blend of the product in mineral oil, was heated with 6 grams of elementary sulfur at 170° C. for 2 hours. As the reaction product thus obtained was gelatinous, 130 grams of mineral oil were added thereto in order to obtain a fluid mixture. The final product, a 1:3 blend in mineral oil, analyzed as follows: 0.51 per cent phosphorus, 3.94 per cent sulfur and 2.9 neutralization number. This product is identified hereinafter as Product two.

To demonstrate the effectiveness of the reaction products contemplated herein as mineral oil improving agents, oil blends containing small quantities of our representative reaction products of Examples one and two were prepared and these blends and a blank oil were subjected to the corrosion test described below. It will readily be seen from inspection of the results of these tests that the reaction products of this invention are effective in stabilizing mineral oils.

CORROSION INHIBITION

Motor oils especially those refined by certain solvent-extraction methods tend to oxidize when submitted to high temperatures and to form products corrosive to metal bearings. This corrosive action may be quite severe with certain bearings such as those having the corrosive susceptibility of cadmium-silver alloys; and may cause their failure within a comparatively short time. The following test was used to determine the corrosive action of motor oil on an automotive connecting rod bearing.

The oil used was a Pennsylvania solvent refined oil having a S. U. V. of 53 seconds at 210° F. The oil was tested by adding a section of a bearing containing a cadmium-silver alloy surface weighing about 6 grams and heating it to 175° C. for 22 hours while a stream of air was bubbled against the surface of the bearing. The loss in weight of the bearing during this treatment is a measure of the amount of corrosion that has taken place. A sample of the oil containing a stabilizing agent was run at the same time as a sample of the straight oil and the loss in weight of the bearing section in the inhibited oil can thus be compared directly with the loss of the section in the uninhibited oil. The results obtained in this test are set forth in Table one below.

TABLE ONE

| Improving agent | Per cent conc. | Bearing loss in milligrams | |
|---|---|---|---|
| | | Uninhibited oil | Inhibited oil |
| Product one | 0.75 | 53 | 0 |
| Do | 0.375 | 53 | 2 |
| Product two | 1.0 | 20 | 0 |
| Do | 0.5 | 20 | 1 |
| Do | 0.25 | 20 | 2 |

OPERATION TEST

We have also carried out tests of an oil and an oil blend containing a representative reaction product of the type contemplated herein to determine the comparative behavior of the unblended oil and of the improved oil composition under actual operating conditions.

LAUSON ENGINE TEST

In this test, a single-cylinder Lauson engine was operated with an oil temperature of 290° F. and a jacket temperature of 212° F. The oil used was a solvent refined oil having a Saybolt Universal viscosity of 45 seconds at 210° F., and the oil blend used was a blend of said oil and Product two. The neutralization number (N. N.) and viscosity in centistokes at 210° F. of the blank oil and of the oil blend were determined after 36 hours. The results are shown below in Table Two.

TABLE TWO

| Improving agent | Per cent conc. | N. N. | Kinematic viscosity at 210° F. |
|---|---|---|---|
| None | | 10.3 | 10.85 |
| Product two | 4.0 | 1.5 | 6.44 |

The phosphorus and sulfur containing reaction products obtained from sulfurized oleone and P₂S₅ and from the sulfurized reaction product of oleone and P₂S₅, as described hereinabove and related products obtained from other unsaturated ketones, may be used in mineral oil fractions in various amounts depending upon the character of the oil, the degree of improvement in the oil to be obtained, the conditions of use, etc. In general, however, it appears that appreciable improvement may be realized with these reaction products in amounts as small as 0.05 per cent. While amounts of 5 per cent or more may be used in such oil fractions, substantial and satisfactory improvement may be obtained with amounts from about 0.25 per cent to about 3.0 per cent.

It is to be understood that while we have described hereinabove certain typical procedures for making the oil addition agents of this invention and have referred to certain reaction products and mineral oils, the invention is not to be construed as limited to these specific features of the description. Thus, it is to be understood that the present invention includes variations of the procedures, which will be apparent to those skilled in the art, and other typical reaction products and petroleum products which come within the scope of the appended claims.

We claim:

1. An improved mineral oil composition comprising a viscous mineral oil fraction having in admixture therewith a minor proportion, from about 0.25 per cent to about 3.0 per cent, of a phosphorus- and sulfur-containing reaction product obtained by reacting substantially one mol of phosphorus pentasulfide with four mols of a sulfurized dioleyl ketone at a temperature between about 100° C. and about 200° C., said sulfurized dioleyl ketone being obtained by sulfurizing dioleyl ketone with elementary sulfur at a temperature between about 150° C. and about 200° C.

2. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at a temperature between about 100° C. and about 200° C., said sulfurized dioleyl ketone being obtained by sulfurizing dioleyl ketone with elementary sulfur at a temperature between about 150° C. and about 200° C.

3. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at a temperature between about 100° C. and about 200° C., said sulfurized dioleyl ketone being obtained by sulfurizing dioleyl ketone with from about 5 per cent to about 15 per cent by weight of elementary sulfur at a temperature between about 150° C. and about 200° C.

4. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at a temperature between about 100° C. and about 200° C. in a non-oxidizing atmosphere, said sulfurized dioleyl ketone being obtained by sulfurizing dioleyl ketone with elementary sulfur at a temperature between about 150° C. and about 200° C.

5. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at a temperature between about 100° C. and about 200° C. in an atmosphere of nitrogen, said sulfurized dioleyl ketone being obtained by sulfurizing dioleyl ketone with elementary sulfur at a temperature between about 150° C. and about 200° C.

6. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at a temperature between about 100° C. and about 200° C. in the presence of a substantially inert diluent, said sulfurized dioleyl ketone being obtained by sulfurizing dioleyl ketone with elementary sulfur at a temperature between about 150° C. and about 200° C.

7. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at a temperature between about 100° C. and about 200° C. in the presence of a substantially inert mineral oil diluent, said sulfurized dioleyl ketone being obtained by sulfurizing dioleyl ketone with elementary sulfur at a temperature between about 150° C. and about 200° C.

8. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at a temperature between about 100° C. and about 200° C. in a non-oxidizing atmosphere and in the presence of a substantially inert diluent, said sulfurized dioleyl ketone being obtained by sulfurizing dioleyl ketone with elementary sulfur at a temperature between about 150° C. and about 200° C.

9. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized dioleyl ketone at about 140° C. in a non-oxidizing atmosphere and in the presence of a substantially inert diluent, said sulfurized dioleyl ketone being obtained by sulfurizing dioleyl ketone with about 10 per cent by weight of elementary sulfur at about 170° C. in the presence of said diluent.

10. An improved mineral oil composition comprising a viscous mineral oil fraction having in admixture therewith a minor proportion, from about 0.25 per cent to about 3.0 per cent, of a phosphorus- and sulfur-containing reaction product obtained by sulfurizing an intermediate phosphorus- and sulfur-containing reaction product with elementary sulfur at a temperature between about 150° C. and about 200° C., said intermediate reaction product being obtained by reacting substantially one mol of phosphorus pentasulfide with four mols of dioleyl ketone at a temperature between about 100° C. and about 200° C.

11. An improved mineral oil composition comprising a viscous mineral oil fraction having in admixture therewith a minor proportion of a phosphorus- and sulfur-containing reaction product obtained by sulfurizing an intermediate phosphorus- and sulfur-containing reaction product with from about 5 per cent to about 15 per cent by weight of elementary sulfur at a temperature between about 150° C. and about 200° C., said intermediate reaction product being obtained by reacting substantially one mol of phosphorus pentasulfide with four mols of dioleyl ketone at a temperature between about 100° C. and about 200° C.

12. An improved mineral oil composition comprising a viscous mineral oil fraction having in admixture therewith a minor proportion of a phosphorus- and sulfur-containing reaction product obtained by reacting substantially one mol of phosphorus pentasulfide with four mols of a sulfurized ketone at a temperature between about 100° C. and about 200° C., said sulfurized ketone being obtained by sulfurizing an unsaturated ketone with elementary sulfur at a temperature between about 150° C. and about 200° C.

13. A mineral oil concentrate containing a minor proportion of a phosphorus- and sulfur-containing reaction product, said concentrate being obtained by reacting substantially one mol of phosphorus pentasulfide with four mols of a sulfurized dioleyl ketone at a temperature between about 100° C. and about 200° C. in the presence of a substantially inert mineral oil, and said sulfurized dioleyl ketone being obtained by sulfurizing dioleyl ketone with elementary sulfur at a temperature between about 150° C. and about 200° C.

14. A mineral oil concentrate containing a minor proportion of a phosphorus- and sulfur-containing reaction product, said concentrate being obtained by reacting substantially one mol of phosphorus pentasulfide with four mols of a sulfurized dioleyl ketone at a temperature between about 100° C. and about 200° C. in the presence of a substantially inert mineral oil, and said sulfurized dioleyl ketone being obtained by sulfurizing dioleyl ketone with elementary sulfur at a temperature between about 150° C. and about 200° C. in the presence of said mineral oil.

15. A mineral oil concentrate containing a minor proportion of a phosphorus- and sulfur-containing reaction product, said concentrate being obtained by reacting substantially one mol of phosphorus pentasulfide with four mols of a sulfurized dioleyl ketone at about 140° C. in an atmosphere of nitrogen and in the presence of a substantially inert mineral oil, and said sulfurized dioleyl ketone being obtained by sulfurizing dioleyl ketone with about 10 per cent of elementary sulfur at about 170° C. in the presence of said mineral oil.

16. A mineral oil concentrate containing a minor proportion of a phosphorus- and sulfur-containing reaction product, said concentrate being obtained by sulfurizing an intermediate phosphorus- and sulfur-containing reaction product, in a substantially inert mineral oil, with elementary sulfur at a temperature between about 150° C. and about 200° C., said intermediate reaction product being obtained by reacting substantially one mol of phosphorus pentasulfide with four mols of dioleyl ketone at a temperature between about 100° C. and about 200° C. in the presence of said mineral oil.

17. A mineral oil concentrate containing a minor proportion of a phosphorus- and sulfur-containing reaction product, said concentrate being obtained by reacting substantially one mol of phosphorus pentasulfide with four mols of a sulfurized ketone at a temperature between about 100° C. and about 200° C. in the presence of a substantially inert mineral oil, and said sulfurized ketone being obtained by sulfurizing an unsaturated ketone with elementary sulfur at a temperature between about 150° C. and about 200° C.

18. A mineral oil concentrate containing a minor proportion of a phosphorus- and sulfur-containing reaction product, said concentrate being obtained by sulfurizing an intermediate phosphorus- and sulfur-containing reaction product, in a substantially inert mineral oil, with elementary sulfur at a temperature of about 170° C., said intermediate reaction product being obtained by reacting substantially one mol of phosphorus pentasulfide with four mols of dioleyl ketone at a temperature of about 200° C. in the presence of said mineral oil.

FERDINAND P. OTTO.
RONALD E. MEYER.